(12) United States Patent
Brown et al.

(10) Patent No.: US 6,961,759 B2
(45) Date of Patent: Nov. 1, 2005

(54) METHOD AND SYSTEM FOR REMOTELY MANAGING PERSISTENT STATE DATA

(75) Inventors: Frances C. Brown, Austin, TX (US); Susan Crayne, Hartsdale, NY (US); Samuel R. Detweiler, Austin, TX (US); Peter Gustav Fairweather, Yorktown Heights, NY (US); Vicki Lynne Hanson, Chappaqua, NY (US); Richard Scott Schwerdtfeger, Round Rock, TX (US); Beth Rush Tibbitts, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 09/961,999

(22) Filed: Sep. 24, 2001

(65) Prior Publication Data

US 2003/0061275 A1 Mar. 27, 2003

(51) Int. Cl.[7] .............................................. G06F 13/00
(52) U.S. Cl. ...................... 709/217; 709/203; 709/219
(58) Field of Search ................................ 709/200–203, 709/217–220, 223–224, 227–229

(56) References Cited

U.S. PATENT DOCUMENTS

| | | | |
|---|---|---|---|
| 5,918,013 A | 6/1999 | Mighdoll et al. | |
| 5,983,273 A | 11/1999 | White et al. | |
| 5,996,022 A | 11/1999 | Krueger et al. | |
| 6,038,595 A | 3/2000 | Ortony | |
| 6,138,150 A | 10/2000 | Nichols et al. | |
| 6,374,300 B2 * | 4/2002 | Masters ...................... | 709/229 |
| 6,389,460 B1 * | 5/2002 | Stewart et al. ............... | 709/217 |
| 6,473,802 B2 * | 10/2002 | Masters ...................... | 709/229 |
| 6,496,931 B1 * | 12/2002 | Rajchel et al. .............. | 713/168 |
| 6,499,052 B1 * | 12/2002 | Hoang et al. ............... | 709/203 |
| 6,675,214 B2 * | 1/2004 | Stewart et al. ............. | 709/226 |
| 6,823,369 B2 * | 11/2004 | Leach et al. ................ | 709/206 |

FOREIGN PATENT DOCUMENTS

| | | |
|---|---|---|
| WO | WO 00/03525 | 1/2000 |
| WO | WO 00/49530 | 8/2000 |

OTHER PUBLICATIONS

Network Working Group, RFC 2109, (Feb. 1997), pp. 1–20.
Network Working Group, RFC 2616, (Jun. 1999).
"A Processor for Selective Routing of Servlet Content to Transcoding Modules", Research Disclosure, (Jun. 1999), IBM Corporation, pp. 889–890.
Network Working Group, RFC 2965, (Oct. 2000), pp. 1–25.

* cited by examiner

*Primary Examiner*—Moustafa M. Meky
(74) *Attorney, Agent, or Firm*—Robert M. Carwell; Dillon & Yudell LLP

(57) ABSTRACT

A system for removing and saving in an intermediary web server Internet cookies being transmitted from a web content server to a client device. Internet cookies, being persistent client data for a specific user and a specific content provider, typically contain sensitive data, including a history of past purchases or financial information about the user such as a credit card number. To protect the security of the cookies, and to allow an authorized user to use the cookies from multiple devices, such as different desktop computers, PDA's or cellular telephones, the cookies are removed from the data response from the web content server and stored in an intermediary web server, where they are accessible to the user.

18 Claims, 2 Drawing Sheets

METHOD AND SYSTEM FOR REMOTELY MANAGING PERSISTENT STATE DATA

BACKGROUND OF THE INVENTION

1. Technical Field

The present invention relates in general to the field of computer networks, and, in particular, to communication between a client device and a content server. Still more particularly, the present invention relates to an improved method and system for storing persistent state data in an intermediary proxy machine and for management of persistent state data for the client device.

2. Description of the Related Art

The Internet comprises a vast network of heterogenous computers and subnetworks all communicating together to allow for global exchange of information. The World Wide Web (WWW) is one of the more popular information services on the Internet. Access to the Internet is typically through an Internet Service Provider (ISP) using the World Wide Web (WWW), a system of Web content servers that support specially formatted documents, typically those in HyperText Markup Language (HTML). The WWW uses browser software to decipher HyperText links to other documents or files located on remote computers, all of which are connected to the Internet. Browsers provide a user-friendly interface that allows users to easily navigate from site to site or file to file around the Internet. Using a browser, a user can access information in the form of text, audio, video, still pictures and related multimedia stored on remote computers or content servers.

Described in a highly simplified manner, the Internet functions in the following manner. A client device, such as a desktop computer, laptop computer, personal digital assistant (PDA), onboard vehicle computer, cellular telephone, etc., sends a request for a Web site. A request from a desktop or laptop computer is typically formatted in the HyperText Transfer Protocol (HTTP) and sent through an Internet Service Provider (ISP). The ISP establishes a link to the Internet, which then passes the HTTP request to a content server. The request is forwarded on from the content server to the content provider, which is typically a web page addressed by a Uniform Resource Indicator (URI) such as a Uniform Resource Locator (URL).

The data response back to the client device from the content provider is routed through the content server, Internet, and ISP to the client device. The data response typically is in the language of HyperText Markup Language (HTML), the standard language for creating documents on the World Wide Web (WWW). HTML defines the structure and layout of a web document by using a variety of tag commands inserted in the document to specify how that document, or portion of the document, should be formatted.

Persistent state data (persistent client state data) is more commonly known as an Internet "cookie." An Internet cookie is typically stored in a field of an HTTP protocol header message given to a web browser, such as Netscape Navigator or Internet Explorer by the web content server that delivers web pages from the website at the URL requested by the user. The protocol header may contain strings of characters (cookie content) that are inserted by a server application, supplied by an Internet Content Provider (ICP). When received by a client browser, these cookies are stored in the random access memory (RAM) or persistent storage device on a user's computer (or other client device) while the user is operating a browser (application program) to access web pages.

The web server, when returning a web site's content to a client, may also send a piece of state information which the client will store. Included in that state information object is a description of the range of URLs of which that state is valid. Any future HyperText Transfer Protocol (HTTP) requests made by the client which fall in that range will include a transmittal of the current value of the client state object data from the client back to the web content server. Data in a cookie may include the number of times a user has visited a web server or particular web page provided by the web server, the domain and path of a Web site, the date that the cookie will expire, the user/client name, plus other variables. Historically, these other variables have included information for a web server to customize information it provides to a user, and to facilitate on-line sales or services, including records of items in a so called "shopping basket," credit card numbers for the user, preferred delivery methods, etc. Thus, the main purpose of passing persistent data in protocol headers such as cookies has been to enable a web server or Internet Content Provider (ICP) to gather and maintain information about a user/client. By setting one or more persistent cookies in the user's cookie file, the next time the user accesses a particular Web site, the ICP can know certain information about the user that will facilitate the user's productive use of the ICP's Web site.

Historically, cookies received by an ICP have been stored by a user agent (browser) in the RAM of the user's computer while the user is communicating with the ICP, and the cookies are then stored on the hard drive of the user's computer if the lifetime of the cookie is longer than the time the user spends at the ICP's Web site. Cookies stored on the computer are typically stored insecurely by the browser, and thus, people accessing the user's computer using dial up means, can easily access and decrypt the cookie information.

The above description assumes only a single client device. However, a variety of network connected devices may be used by the same user. These devices include desktop computers, laptop computers, set top boxes (Internet connection through standard television sets), Personal Digital Assistants (PDA's) and public kiosk computers, all of which may be connected through a Local Area Network (LAN) or Wide Area Network (WAN). In addition, cellular telephones may access the Internet through Public Switch Telephone Networks (PSTN), Integrated Services Digital Networks (ISDN) and similar telephone systems. If a user is using one device, such as his desktop computer, at a particular Web site, the cookies would be stored in that desktop and therefore not available to other user devices such as a PDA or laptop. The user must redefine cookies for the other devices, which may be inconsistent with the cookies initially set on the desktop computer.

It should therefore be apparent that there exists a need for a method that will allow for centralized management of cookies in an Internet environment for a specific user. It would further be desirable to devise a computer program product wherein such a method may be performed on a computer system. In addition, it would be desirable to devise an intermediary proxy machine having the ability to manipulate and control the cookies without passing them back to the client device.

SUMMARY OF THE INVENTION

The present invention is a method and system using a web intermediary proxy machine, through which Internet requests pass from the client/user to the web content server. As requests and replies pass and back and forth through the intermediary server, persistent cookies are removed and stored in the proxy machine. Cookie information is allowed to pass from the client/user to the intermediary proxy machine, from the proxy machine to the content server, and back from the content server to the proxy machine. However, in the preferred embodiment no cookies are allowed to pass from the proxy back to the client/user. The cookies are identified as belonging to a specific user identification, and are therefore accessible for a variety of client devices used by the same authorized user.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
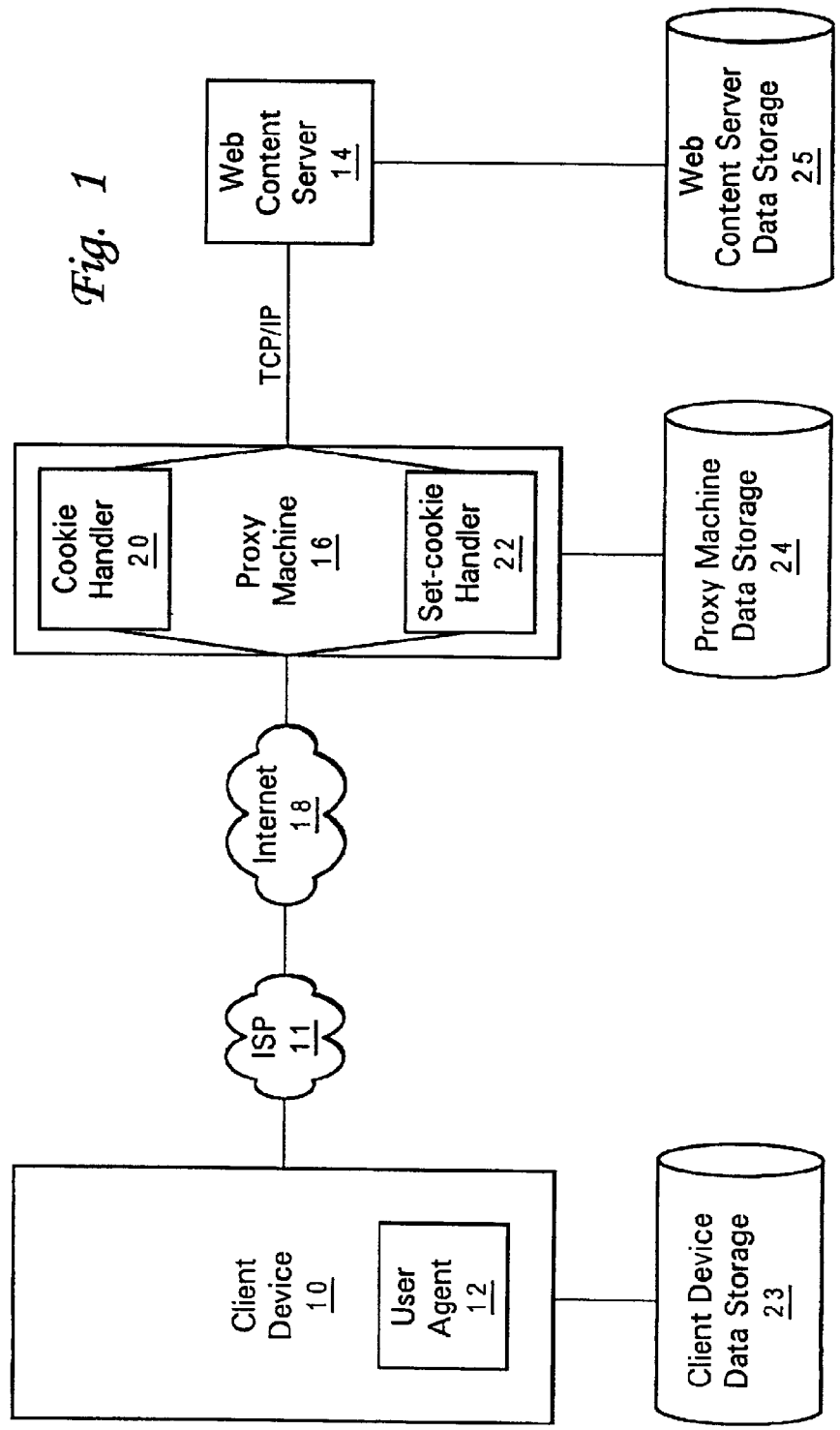
FIG. 1 depicts a block diagram of an Internet connection using an intermediary proxy machine.

With reference now to the figures and in particular with reference to FIG. 1, there is depicted a block diagram of an Internet connection including intermediary proxy machine 16 which may be utilized to implement the present invention. As depicted, client device 10 connects to Internet 18, typically through an Internet Service Provider ISP 11. Client device 10 may be any type of network connectable device, such as a desktop computer, a laptop computer, set top box, Personal Digital Assistant (PDA), public computer kiosk, Automated Teller Machine (ATM), or cellular telephone. Internet 18 is understood to be a world-wide-network of interconnected computers affording access between web content server 14 and ultimately client device 10. Web content server 14 is a computer or device on a network that manages and delivers web content, typically in HyperText Markup Language format (HTML), which is stored in web content server data storage 28, which is typically a Web site located at a specific uniform resource locator (URL). Further, it is understood that the function of Internet 18 can also be accomplished by any network of any interconnected computers. ISP 11 may be any type of Internet access provider appropriate for the specific client device 10, with ISP 11 providing access to Internet 18 through a dial up modem, a Digital Subscriber Line (DSL), Public Switched Telephone Network (PSTN) or other wired or wireless connections.

Connected to ISP 11 is intermediary proxy machine 16. Intermediary server 16 is depicted in FIG. 1 as being between Internet 18 and web content server 14. However, proxy machine 16 may alternatively be connected between client device 10 and ISP 11 or other location between client device 10 and web content server 14. Preferably, proxy machine 16 includes a security server, systems for running web applications such as mail, bookmarks, history lists and mobility solutions, storage for a particular client including user profiles, history lists and bookmarks, as well as network dispatcher interfaces between client device 10 and functions within proxy machine 16. Proxy machine 16 includes means for cookie handler 20 and set-cookie handler 22. Cookie handler 20 and set-cookie handler 22 may be resident in proxy machine 16, or may be accessible from a remote location. The terms "cookie" and "persistent state data" are understood to be interchangeable.

Continuing to reference FIG. 1, web content server 14 may send an HTTP header containing "set-cookie" elements to user agent 12. However, these cookies are intercepted by proxy machine 16, which contains software for handling "cookie" and "set-cookie" header interception, interpretation, and caching. In the preferred embodiment, this cookie manipulation includes identification of a specific user, and associating the cookie with that user so that other users are not afforded access to the specified user's cookies. Set-cookie handler 22 interprets "set-cookie" headers by recognizing the presence of the set-cookie directive and acting upon it as described below. If no "set-cookie" directive is detected, the message is passed through to user agent 12 without other action.

Upon detection of a set-cookie directive, set-cookie handler 22 performs the kinds of operations that user agent 12 would have performed upon recognizing the same directive. These types of operations include cookie storage, management, transmission, archiving, caching and security control as known by those skilled in the art, typically under protocols promulgated by the Network Working Group's Request For Comments (RFC) 2109 and 2965. The cookie information is stored in proxy machine data storage 24, so parameters in the cookie management header such as name, path, and domain can be appropriately retrieved as described below.

The set-cookie handler 22 ensures that the cookie header is set to expire so that when the set-cookie directive is passed to user agent 12, a cookie will be created in user agent 12 memory marked to expire at the end of the session. This transformation enables any references to the cookie by user agent 12 script to return the proper value, yet does not create a persistent cookie on client device data storage 23.

The cookie handler 20 complements set-cookie handler 22 by providing information to web content server 14 that normally would be supplied by user agent 12 if proxy machine 16 were not used. Cookie handler 20 takes requests sent from user agent 12, looks up the appropriate cookie stored by name, path, and domain in proxy machine data storage 24, and inserts the cookie data into the HTTP request going to web content server 14. Web content server 14 then accesses the requested information from web content server data storage 25 for transmission back to proxy machine 16.

Figure 2:
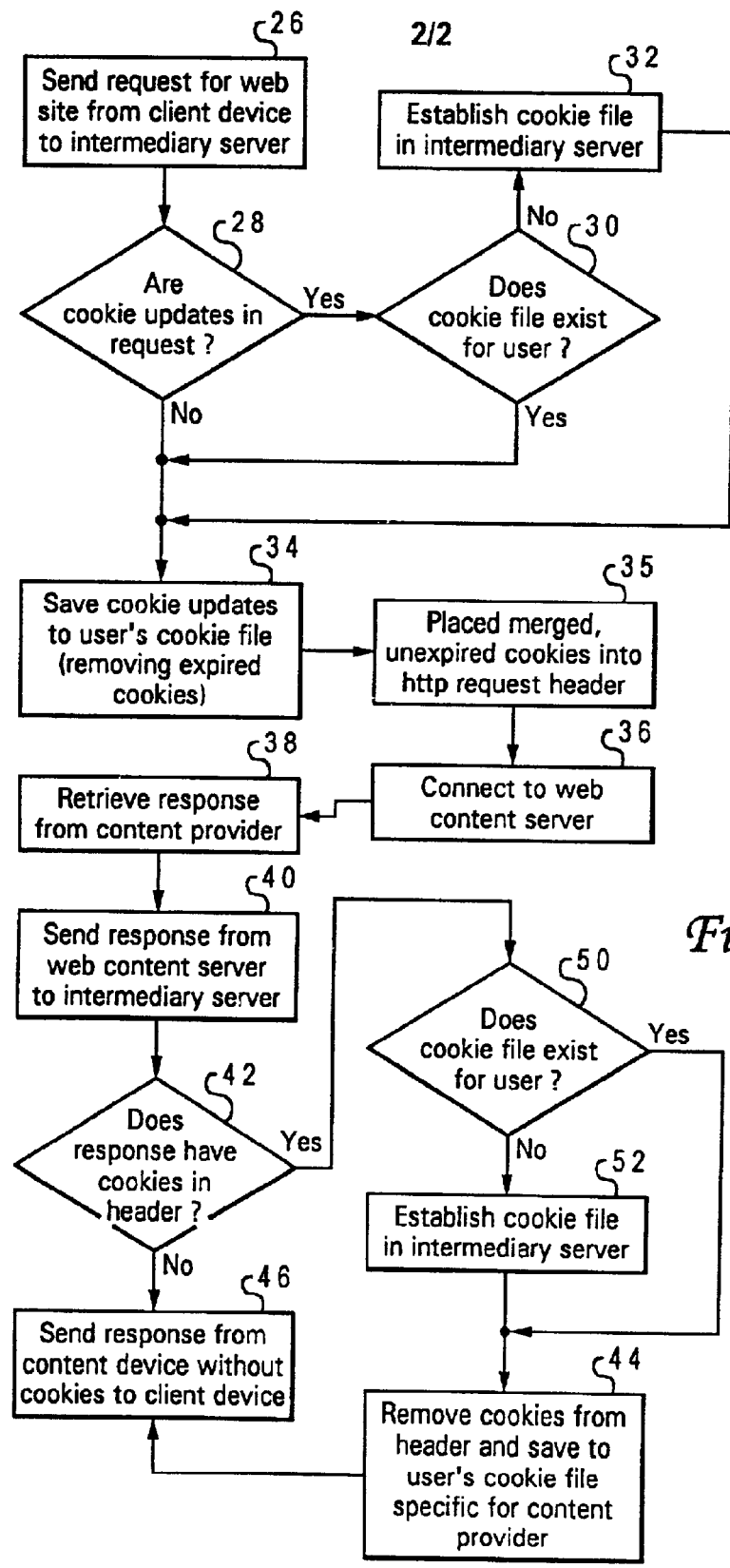
FIG. 2 illustrates a high-level logic flow chart that depicts cookie manipulation.

Referring now to FIG. 2 a request for a Web site is sent from client device 10 to proxy machine 16, as illustrated in block 26. When proxy machine 16 receives the request, it will examine the request to see if there are any cookie updates in the request for the Web site (if the request is not an initial Web site request), as shown in Block 28. These cookie updates would be in response to the cookie that was introduced to the client using client device 10, typically included in a "set-cookie" header as part of a HyperText Transfer Protocol (HTTP) response from web content server 14. As will be more clearly understood later, these cookies will not reside in client device 10, but rather are resident to or accessible to proxy machine 16 via proxy machine data storage 24. The cookie, which may include financial data, past preferences, past purchases, past inquiries and other historical data for a specific user of client device 10 may be updated by input from client device 10, such as adding new order items to an e-commerce transaction, changing preferred method of delivery, etc.

Continuing the examination of FIG. 2, if cookie updates are in the request from client device 10, cookie handler 20 will query whether a cookie file exists in proxy machine data storage 24 for that user, as illustrated in block 30. If such a file does not exist, it will be established in proxy machine data storage 24 as well as a cache in proxy machine 16, as shown in block 32. Any cookie updates from the user would then be stored in proxy machine data storage 24 as well as a cache in proxy machine 16, as shown in block 34. Intuitively, the only situation in which proxy machine 16 would not have a cookie file for a user would be in situations where client device 10 had previously bypassed proxy machine 16 when accessing web content server 14. In such a situation, cookies from that bypassed connection would reside in client device 10, and the initial connection between client device 10 and that specified web content server 14 for a particular content provider (typically a web page that provides content to web content server 14) would result in the establishment of a cookie file specific for that content provider and the specific user of client device 10. In the preferred embodiment, however, all connections between client device 10 and web content server 14 would historically have been made through proxy machine 16. Therefore, any cookies from web content server 14 going to client device 10 would have been removed and stored and/or cached by proxy machine 16 for a particular content provider and a particular user of client device 10. It is noted here that the cookies will be specific for content provider, and a specific user. That user may use any client device 10, including a desktop computer, PDA, wireless cellular telephone, or other connecting device, but the cookies for that user and that content provider would be available to any such client device 10.

Still referencing FIG. 2, if cookie updates are found in the request from client device 10 to proxy machine 16, and a cookie file has been established for that user and that requested content provider, the cookie updates are stored in the user's cookie file for that content provider and expired cookies are deleted, as shown in block 34. As shown in block 35, cookies required for the intended content are then set into the HTTP request header for passing to the appropriate server application in web content server 14. As illustrated in block 36, proxy machine 16 then connects through Internet 18 to web content server 14, which serves a data response from a content provider back to proxy machine 16, as depicted in blocks 38 and 40. When proxy machine 16 receives the data response from the content provider, it queries whether there are any cookies in the set cookie header of the HTTP response sent by web content server 14, as depicted in block 42. If there are cookies present, a query, as illustrated in block 50, will be placed to proxy machine data storage 24 asking if a current file exists for the specific user and the specific content provider. If not, such a file will be established, as depicted in blocks 50 and 52. As illustrated in block 44, if there are any cookies coming from the content provider through web content server 14, the cookies are removed from the HTTP response, and then are stored, either as a new file or as an update to an existing cookie file in proxy machine data storage 24 for that specific user and for that specific content provider, as illustrated in block 44. Finally, as shown in block 46, the data response from the content provider is sent back to client device 10 without any cookies.

By maintaining identified cookies in a cookie file accessible exclusively by proxy machine 16, and the cookies not being resident in client device 10, multiple benefits arise. First, security can be insured with proxy machine 16 by allowing only secure sockets to be used between proxy machine 16 and web content server 14. A socket is a software object that establishes a secure connection between proxy machine 16 and web content server 14. While most web content servers 14 use a secure socket to send cookies, some may not. This insecure connection can leave the cookies vulnerable to outside hackers. In the preferred embodiment, only secure socket connections are used between proxy machine 16 and web content server 14. Security can be further ensured by encrypting cookies stored in proxy machine data store 24.

Another significant benefit of storing all cookie files in proxy machine 16 is that the same cookie file can be accessed from any client device 10 used by the same client. For example, if the client were to have an e-commerce account to a content provider, a cookie file can be established using a first client device 10, such as a desktop computer. When the same client/user wishes to access that particular content provider and a specific account for that client/user, but now using a different client device 10 such as a PDA, the cookies allowing access to that account are now available to that same client/user by routing his request through the same proxy machine 16, which has access to the cookie files for that client/user in proxy machine data storage 24. As noted above, in the preferred embodiment, only an authorized user identified by proxy machine 16 as being associated with specified cookies will have access to those cookies. That is, cookies are stored in proxy machine 16 for a specific authorized user, who is the only user authorized to access the cookies in the preferred embodiment, and access to the cookies is thus denied to non-authorized users.

Although aspects of the present invention have been described with respect to the Internet, it should be understood that the present invention alternatively may be implemented in any network system, including a Local Area Network (LAN) or Wide Area Network (WAN).

It is understood and appreciated that instructions from a content provider directing that the content provided is not to be transcoded or similarly manipulated should be honored. For example, a "no-transform directive" in an HTTP header or similar instructions should be followed, and the content not transcoded or similarly manipulated according to the instructions of the content provider. A description that is illustrative of such an instruction is found in Section 14.9.5 of the 1999 Network Working Group's HyperText Transfer Protocol HTTP/1.1.

While the invention has been particularly shown and described with reference to a preferred embodiment, it will be understood by those skilled in the art that various changes in form and detail may be made therein without departing from the spirit and scope of the invention.

What is claimed is:

1. A method for managing persistent state data in a computer system, said method comprising:

Connecting an intermediary proxy machine between a plurality of client devices and a web content server on a computer system;

removing, at the intermediary proxy machine, at least one persistent state data from a data response being transmitted to at least one of the client devices;

storing said at least one persistent state data in the intermediary proxy machine, wherein said at least one persistent state data is available to be utilized by any authorized client device of the plurality of client devices;

storing said persistent state data in said at least one of the client devices; and in response to a session between said intermediary proxy machine and said at least one of the client devices ending, removing said persistent state data from said at least one of the client devices.

2. The method of claim 1, further comprising:

inserting the persistent data stored in the intermediary proxy machine into a data request being sent from the at least one of the client devices; and sending the data request with the persistent data to a server application on the web content server.

3. The method of claim 2, further comprising:

identifying an authorized user accessing the intermediary proxy machine;

associating the authorized user with said at least one persistent state data; and providing access to the persistent state data to the authorized user.

4. The method of claim 2, further comprising:

identifying an authorized user accessing the intermediary proxy machine;

associating the authorized user with said at least one persistent state data;

providing access to the persistent state data to the authorized user; and denying access to the persistent state data to a non-authorized user.

5. The method of claim 1, wherein the connection between the intermediary proxy machine and the web content server is secure.

6. The method of claim 5, wherein only said persistent data stored in said intermediary proxy machine is encrypted such that only said web content server can decrypt said persistent data.

7. A system for managing persistent state data in a computer system, said system comprising:

means for connecting an intermediary proxy machine between plurality of client devices and a web content server on a computer system;

means for removing, at the intermediary proxy machine, at least one persistent state data from a data response being transmitted to at least one of the client devices;

means for storing said at least one persistent state data in the intermediary proxy machine, wherein said at least one persistent state data is available to be utilized by any authorized client device of the plurality of client devices;

means for storing said persistent state data in said at least one of the client devices; and means for, in response to a session between said intermediary proxy machine and said at least one of the client devices ending, removing said persistent state data from said at least one of the client devices.

8. The system of claim 7, further comprising:

means for inserting the persistent data stored in the intermediary proxy machine into a data request being sent from the at least one of the client device; and means for sending the data request with the persistent data to a server application on the web content server.

9. The system of claim 8, further comprising:

means for identifying an authorized user accessing the intermediary proxy machine;

means for associating the authorized user with said at least one persistent state data; and means for providing access to the persistent state data to the authorized user.

10. The system of claim 8, further comprising:

means for identifying an authorized user accessing the intermediary proxy machine;

means for associating the authorized user with said at least one persistent state data;

means for providing access to the persistent state data to the authorized user; and means for denying access to the persistent state data to a non-authorized user.

11. The system of claim 7, wherein the connection between the intermediary proxy machine and the web content server is secure.

12. The system of claim 7, wherein said persistent data stored in said intermediary proxy machine is encrypted such that only said web content server can decrypt said persistent data.

13. A computer program product, stored on a computer readable media, for managing persistent state data in a computer system, said computer program product comprising:

computer program code for connecting an intermediary proxy machine between a plurality of client devices and a web content server on a computer system;

computer program code for removing, at the intermediary proxy machine, at least one persistent state data from a data response being transmitted to at least one of the client devices;

computer program code for storing said at least one persistent state data in the intermediary proxy machine, wherein said at least one persistent state data is available to be utilized by any authorized client device of the plurality of client devices;

computer program code for storing said persistent state data in said at least one of the client devices; and computer program code for, in response to a session between said intermediary proxy machine and said at least one of the client devices ending, removing said persistent state data from said at least one of the client devices.

14. The computer program product of claim 13, further comprising:

computer program code for inserting the persistent data stored in the intermediary proxy machine into a data request being sent from the at least one of the client devices; and computer program code for sending the data request with the persistent data to a server application on the web content server.

15. The computer program product of claim 14, further comprising:

computer program code for identifying an authorized user accessing the intermediary proxy machine;

computer program code for associating the authorized user with said at least one persistent state data; and computer program code for providing access to the persistent state data to the authorized user.

16. The computer program product of claim 14, further comprising:

computer program code for identifying an authorized user accessing the intermediary proxy machine;

computer program code for associating the authorized user with said at least one persistent state data;

computer program code for providing access to the persistent state data to the authorized user; and computer program code for denying access to the persistent state data to a non-authorized user.

17. The computer program as in claim 13, wherein the connection between the intermediary proxy machine and the web content server is secure.

18. The computer program as in claim 17, wherein only said persistent data stored in said intermediary proxy machine is encrypted such that only said web content server can decrypt said persistent data.

* * * * *